(12) United States Patent
Kumar et al.

(10) Patent No.: US 9,020,793 B2
(45) Date of Patent: Apr. 28, 2015

(54) METHOD, SYSTEM AND PROGRAM STORAGE DEVICE FOR RESERVOIR SIMULATION UTILIZING HEAVY OIL SOLUTION GAS DRIVE

(75) Inventors: Mridul Kumar, Sugar Land, TX (US);
Frederic Gadelle, Berkeley, CA (US);
Akshay Sahni, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 874 days.

(21) Appl. No.: 11/613,499

(22) Filed: Dec. 20, 2006

(65) Prior Publication Data
US 2008/0154563 A1 Jun. 26, 2008

Related U.S. Application Data

(60) Provisional application No. 60/753,900, filed on Dec. 22, 2005.

(51) Int. Cl.
*G06G 7/48* (2006.01)
*E21B 49/00* (2006.01)
(Continued)

(52) U.S. Cl.
CPC ............... *E21B 49/00* (2013.01); *E21B 43/00* (2013.01); *G06F 17/5009* (2013.01); *G06F 2217/16* (2013.01)

(58) Field of Classification Search
USPC ............... 702/13, 10; 166/305.1, 263, 400; 703/10, 13, 6, 9
See application file for complete search history.

(56) References Cited

U.S. PATENT DOCUMENTS 26,504 A 12/1859 Lawrence
3,507,330 A 4/1970 Gill
(Continued)

OTHER PUBLICATIONS

Buckles, John J. et al., "Toward Improved Prediction of Reservoir Flow Performance", 1994, Los Alamos Science, No. 22.*
(Continued)

*Primary Examiner* — Kamini S Shah
*Assistant Examiner* — Cedric D Johnson

(57) ABSTRACT

A method, a system and a program storage device for predicting a property of a fluid, such as fluid production from a subterranean reservoir containing heavy oil entrained with gas is described. The method includes developing a baseline correlation of gas relative permeability $k_{rg}$ versus gas saturation $S_g$. A capillary number dependent correlation is determined capturing the relationship between at least one of critical gas saturation $S_{gc}$ and capillary number $N_{ca}$ and gas relative permeability $k_{rgro}$ and capillary number $N_{ca}$ phased upon a plurality of depletion rates. Capillary numbers $N_c$ are calculated for a plurality of cells in a reservoir model representative of the subterranean reservoir. The baseline correlation is then adjusted to comport with at least one of $S_{gc}$ and $k_{rgro}$ selected from the capillary number dependent correlation to produce a plurality of corresponding adjusted baseline, correlations. Gas relative permeabilities $k_{rg}$ for the plurality of cells are selected from the corresponding adjusted baseline correlations. A reservoir simulation is then run utilizing the selected relative permeabilities $k_{rg}$ to predict a property of at least one fluid in a subterranean reservoir containing heavy oil entrained with gas.

20 Claims, 7 Drawing Sheets

(51) Int. Cl.
*E21B 43/00* (2006.01)
*G06F 17/50* (2006.01)

(56) References Cited

U.S. PATENT DOCUMENTS

| | | | |
|---|---|---|---|
| 3,580,335 A | 5/1971 | Bednarski et al. | |
| 4,442,710 A | 4/1984 | Meng | |
| 4,787,450 A | 11/1988 | Andersen et al. | |
| 5,314,017 A | 5/1994 | Schecter et al. | |
| 5,335,542 A | 8/1994 | Ramakrishnan et al. | |
| 5,497,321 A | 3/1996 | Ramakrishnan et al. | |
| 6,052,520 A | 4/2000 | Watts, III et al. | |
| 6,227,296 B1 | 5/2001 | Reppert et al. | |
| 6,490,531 B1 | 12/2002 | Goglin et al. | |
| 6,810,332 B2 * | 10/2004 | Harrison | 702/13 |
| 2005/0165593 A1 | 7/2005 | Lenormand et al. | |

OTHER PUBLICATIONS

Ostos, A. et al., Capillary Number in Heavy Oil Solution Gas Drive and Its Relationship with Gas-Oil Relative Permeability Curves, Apr. 17-21, 2004, SPE/DOE Fourteenth Symposium on Improved Oil Recovery, Society of Petroleum Engineers.*

Boom, W. et al., "Experimental Evidence for Improved Condensate Mobility at Near-Wellbore Flow Conditions", Oct. 22-25, 1995, SPE Annual Technical Conference & Exhibition, Society of Petroleum Engineers.*

Blom, S.M.P. et al., "How to Include the Capillary Number in Gas Condensate Relative Permeability Functions?", Sep. 27-30, 1998, SPE Annual Technical Conference and Exhibition, Society of Petroleum Engineers, Inc.*

Knudsen, Henning Arendt et al., Bulk Flow Regimes and Fractional Flow in 2D Porous Media by Numerical Simulations, 2002, Kluwer Academic Publishers.*

Delshad, Mojdeh et al., "Modeling Wettability Alteration using Chemical EOR Processes in Naturally Fractured Reservoirs", Sep. 30, 2005, Center for Petroleum and Geosystems Engineering, University of Texas at Austin.*

Henderson G.D. et al., "The Effect of Velocity and Interfacial Tension on Relative Permeability of Gas Condensate Fluids in the Wellbore Region", 1997, Elsevier Science B.V.*

Li, Dachang et al., "Scaleup of Reservoir-Model Relative Permeability with a Global Method", Aug. 1996, SPE Reservoir Engineering, Society of Petroleum Engineers.*

Petersen, E.B. et al., "Determination of Critical Gas Saturation and Relative Permeabilities Relevant to the Depressurization of the Statfjord Field", Oct. 5-9, 2004, International Symposium of the Society of Core Analysis.*

Chatzis, Ioannis et al., "Correlation of Capillary Number Relationships for Sandstone", Oct. 1984, Society of Petroleum Engineers of AIME.*

Bennion, D.B. et al., A Correlation of Water and Gas-Oil Relative Permeability Properties for Various Western Canadian Sandstone and Carbonate Oil Producing Formations, Jun. 11-13, 2002, Canadian International Petroleum Conference, Petroleum Society.*

Mott, Robert et al., "Measurements and Simulation of Inertial and High Capillary Number Flow Phenomena in Gas-Condensate Relative Permeability", Oct. 1-4, 2000, 2000 SPE Annual Technical Conference and Exhibition, Dallas, Texas, Society of Petroleum Engineers.*

E. F. Johnson, et al., Calculations of Relative Permeability from Displacement Experiments, Petroleum Transactions, AIME, Dec. 20, 1957, Paper No. T.N. 2027, pp. 370-372, vol. 216, American Institute of Mining, Metallurgical, and Petroleum Engineers, Littleton, Colorado.

S. C. Jones, et al., Graphical Techniques for Determining Relative Permeability from Displacement Experiments, Journal of Petroleum Technology, May 1978, Paper No. SPE 6045, pp. 807-817, vol. 30, Society of Petroleum Engineers, Houston, Texas.

A. R. Kovscek, Heavy and Thermal Oil Recovery Production Mechanisms, Quarterly Technical Progress Report, Reporting Period: Jan. 1, 2003-Mar. 31, 2003, Report Date: Apr. 2003, Petroleum Engineering Department, Stanford University, Stanford, California.

R. Kumar, et al., An Investigation Into Enhanced Recovery Under Solution Gas Drive in Heavy Oil Reservoirs, SPE/DOE Improved Oil Recovery Symposium, Apr. 3-5, 2000, Paper No. 59336-MS, Society of Petroleum Engineers, Inc., Tulsa, Oklahoma.

R. Kumar, et al., Effect of Depletion Rate on Gas Mobility and Solution Gas Drive in Heavy Oil, Society of Petroleum Engineers' Journal (SPEJ), Jun. 2002, Paper No. 78438, pp. 213-220, Society of Petroleum Engineers, Richardson, Texas.

R. Kumar, et al., Effect of Viscosity and Diffusion Coefficient on the Kinetics of Bubble Growth in Solution-Gas Drive in Heavy Oil, Journal of Canadian Petroleum Technology (JCPT), Mar. 2001, pp. 30-37, vol. 40 (No. 3), Calgary, Alberta, Canada.

R. Kumar, et al., Solution-Gas Drive in Heavy Oil: Field Prediction and Sensitivity Studies Using Low Gas Relative Permeability, Journal of Canadian Petroleum Technology (JCPT), Mar. 2002, pp. 26-32, vol. 41 (No. 3), Calgary, Alberta, Canada.

B. Maini, Foamy-Oil Flow, Distinguished Author Series: Society of Petroleum Engineers, Oct. 2001, pp. 54-64, Paper No. SPE 68885, Richardson, Texas.

A. Ostos, et al., Capillary Number in Heavy Oil Solution Gas Drive and its Relationship with Gas-Oil Relative Permeability Curves, Society of Petroleum Engineers Journal (SPEJ), Apr. 2004, Paper No. SPE 89430, Richardson, Texas.

M. Pooladi-Darvish, et al., Solution-Gas Drive in Heavy Oil Reservoirs, Journal of Canadian Petroleum Technology (JCPT), Apr. 1999, pp. 54-61, vol. 38 (No. 4), Calgary, Alberta, Canada.

A. Sahni, et al., Experiments and Analysis of Heavy-Oil Solution-Gas Drive, Society of Petroleum Engineers Journal (SPEJ), Jun. 2004, pp. 217-229, Paper No. SPE 88442, Richardson, Texas.

O. Talabi, et al., A Simulator for Solution-Gas Drive in Heavy Oils, Journal of Canadian Petroleum Technology (JCPT), Apr. 2004, pp. 31-38, vol. 43 (No. 4), Calgary, Alberta, Canada.

G.-Q. Tang, et al., Heavy-Oil Solution Gas Drive in Consolidated and Unconsolidated Rock, Society of Petroleum Engineers Journal (SPEJ), Jun. 2006, pp. 259-268, Paper No. SPE 87226, Richardson, Texas.

A. Ostos et al. Capillary Number in Heavy Oil Solution Gas Drive and Its Relationship with Gas-Oil Relative Permeability Curves, SPE 89430, 2004.

* cited by examiner

METHOD, SYSTEM AND PROGRAM STORAGE DEVICE FOR RESERVOIR SIMULATION UTILIZING HEAVY OIL SOLUTION GAS DRIVE

RELATED APPLICATIONS

This nonprovisional application claims the benefit of provisional patent application U.S. Ser. No. 60/753,900, filed on Dec. 22, 2005 which is hereby incorporated by reference in its entirety.

TECHNICAL FIELD

The present invention relates generally to methods and systems for reservoir simulation predicting the flow of fluids in an underground reservoir, and more particularly, to enhancing reservoir performance forecasting by accounting for fluid flow effects due to heavy oil solution gas drive.

BACKGROUND OF THE INVENTION

Reservoir simulation is used to predict the flow of fluids in an underground reservoir. The fluid flow may include oil, gas and water. Such reservoir forecasting is important in reservoir management and estimating the potential recovery from a reservoir.

Reservoir simulation is well known throughout the oil industry and in the scientific literature. A good primer on the principles behind reservoir simulation is K. Aziz and A. Settari, *Petroleum Reservoir Simulation*, Elsevier Applied Science Publishers, London (1979). Another description of how reservoir simulation is generally performed is described in U.S. Pat. No. 6,052,520 to Watts III et al. These references, are hereby incorporated by reference in their entireties.

The following are general steps taken in a conventional reservoir simulation. First, a reservoir is selected for which the rock and fluid properties are to be modeled and simulated. The reservoir is modeled and discretized into a plurality of cells. Nonlinear governing equations are constructed for each cell, generally in the form of finite difference equations, which are representative of properties of rocks and fluids in the reservoir. Examples of rock properties include porosity, capillary pressure, and relative permeability for each phase of fluid (oil, water, gas.) Examples of fluid properties include oil viscosity, oil formation factor ($B_o$), and pressure, temperature, and saturation in each of the cells. Nonlinear terms in these equations are linearized to arrive at a set of linear-equations for each timestep of the simulation. These linear equations can then be solved to estimate solutions for unknowns such as pressure and saturation in the cells. From these values of pressure and saturation other properties can be estimated including the overall production of oil, gas and water from the reservoir in a timestep. The aforementioned steps are repeated over many such timesteps to simulate fluid flow over time in the reservoir.

One of the key properties needed in reservoir simulation is the permeability of a rock to flow. Absolute permeability K is a measure of a rock's ability to transmit flow and can vary greatly throughout a reservoir and surrounding formations. When gas, oil and water move through porous rock, they do not move at equal velocities. Rather, the fluids compete with one another. Relative permeability, $k_r$, is the ratio of the effective permeability, $k_e$, when more than one fluid is present, to the absolute permeability K. Effective permeability $k_e$ is the measured permeability of a porous medium to one fluid when another is present. The relationship between relative permeability $k_r$ and saturation S depends on the reservoir rock and fluid and may vary between formations. Also, the relative permeability $k_r$ depends on the relative proportion of the fluids present, i.e. fluid saturations.

FIG. 1 illustrates a typical relative permeability $k_{rg}$ versus saturation $S_g$ curve for gas. Gas cannot flow at any appreciable rate until gas saturation reaches a minimum threshold value. Looking to FIG. 1, this threshold value is referred to as critical gas saturation $S_{gc}^0$ and begins at a value of approximately 0.03 or about 3% saturation. At the other end of the curve is an endpoint relative permeability $k_{rgro}^0$ which is the gas relative permeability value $k_{rg}$ at which movement of residual oil remaining in the rock is minimal. As reservoir rock will always contain a minimal amount of residual oil, gas saturation cannot reach 100%. The total percentage of saturation must add up to 100%. In this case, there is a maximum 76% gas saturation $S_g$ and 24% residual oil saturation $S_{org}$. As seen in FIG. 1, the maximum relative permeability, $k_{rgro}^0$, occurs at a saturation of approximately 0.76 with $k_r$=0.40. These values of $S_{gc}^0$ and $k_{rgro}^0$ shall be referred to as endpoint baseline values for gas saturation $S_g$ and relative permeability $k_{rg}$.

Ideally, relative permeability curves are developed through laboratory experiments on core samples taken from reservoirs for which reservoir simulation is to be performed. For example, displacement tests may be used to develop the relative permeability $k_{rg}$ vs. saturation $S_g$ curves. Such tests are well known. Particularly well known displacement test procedures are described in E. F. Johnson, D. P. Bossler, and V. O. Naumann, *Calculations of Relative Permeability from Displacement Experiments*, Trans. Am. Inst. Mining Engineers, Volume 216, 1959, pp. 370-378 and S. C. Jones and W. O. Roszelle, *Graphical Techniques for Determining Relative Permeability from Displacement Experiments*, Journal of Petroleum Engineering, Volume 30, pp. 807-817 (1978). These displacements experiments are usually conducted at slow depletion rates as it is commonly accepted that permeability curves are generally independent, of how fast gas flows through reservoir rock.

Alternatively, if core samples are not available, the relative permeability $k_{rg}$ versus saturation $S_k$ curves can be theoretically created. For example, the curves may be developed from comparable analogue reservoirs.

Once relative permeability $k_{rg}$ versus saturation $S_g$ curves have been obtained, then the relative permeabilities $k_{rg}$ to be used in a reservoir simulation can simply be obtained from these curves assuming saturations $S_g$ in the cells of the reservoir model are known. The saturations $S_g$ are generally known either from initial conditions established at the beginning of a simulation, from the last timestep in the simulation or else from calculations within an iteration in a timestep.

The production of heavy oil is initially driven primarily by oil pressure. Heavy oil may be considered to include oil having an API gravity 20° or less. Significant quantities of gas are often entrained within the heavy oil while under high reservoir pressures. After sufficient production of heavy oil from a reservoir, the pressure in portions of the reservoir may drop below the bubble point pressure. At this pressure, gas readily comes out of solution from the heavy oil. Once sufficient gas has been released from the oil, the gas is believed to form a continuous phase and gas can flow through the reservoir and the rate of production of gas is significantly enhanced. As indicated above, the saturation $S_g$ at which there is an initiation of gas flow is referred to as the critical gas saturation or $S_{gc}$. FIG. 11 shows a graph of cumulative gas produced from a core sample versus time in minutes. The breakpoint in the curve shown there represents $S_{gc}$.

Tests have shown that the amount of oil recovery from a heavy oil reservoir is dependent upon the rate of depletion of the reservoir. Often higher rates of depletion will lead to an overall enhanced oil recovery. As the mechanisms of heavy oil solution gas drive are not well understood, reservoir simulators typically utilize static gas relative permeability $k_{rg}$ versus saturation $S_g$ curves, such as the one seen in FIG. 1, which are independent of fluid flow or depletion rates. Once these curves are developed for respective types of rock which are to be modeled, the curves will remain the same (i.e., endpoints of $S_{gc}^0$ and $k_{rgro}^0$ remain fixed) throughout the reservoir simulation regardless of the rate of flow through the reservoir cells. Such assumptions that permeability curves are static for general reservoir simulation of hydrocarbon bearing subterranean formations containing non-heavy oil are generally satisfactory.

However, in the case of heavy oil, non-equilibrium solution gas drive ("Foamy Oil") is a significant production mechanism affecting critical gas saturation $S_{gc}$ and oil recovery. Currently, understanding of heavy oil solution gas drive at all scales (pore, core and field) is limited. Conventional reservoir simulators fail to accurately account for this solution gas drive in forecasting fluid flow in a reservoir. This is a significant shortcoming often resulting in forecasts which underestimate heavy oil production. The present invention overcomes this shortcoming by accounting for the effects of heavy oil solution gas drive.

SUMMARY OF THE INVENTION

A method of predicting a property of at least one fluid in a subterranean reservoir containing heavy oil entrained with gas is disclosed. For example, the property might include the overall production of fluids from the reservoir, i.e., oil, gas and water. The prediction is made using a reservoir simulator which uses a reservoir model having a plurality of cells representative of the reservoir. For at least some of the cells and for at least some of the iterations of the reservoir simulation, gas relative permeability $k_{rg}$ is dependent upon the local fluid velocities $v_a$ in the cells.

In a preferred embodiment of this method, a baseline correlation is developed for gas relative permeability $k_{rg}$ versus gas saturation $S_g$, typically based on displacements tests performed at slow depletion rates. Next, a capillary number $N_{ca}$ dependent correlation is developed between at least one of, and most preferably, both of critical gas saturation $S_{gc}$ and capillary number $N_{ca}$ and endpoint of gas relative permeability $K_{rgro}$ and capillary number $N_{ca}$. Non-limiting examples of how this correlation may be expressed include, by way of example and not limitation, using a mathematical equation which describes a curve or by creating a corresponding lookup table.

These experimentally derived capillary number $N_{ca}$ dependent correlations can then be used, in conjunction with reservoir simulation, to capture the effects that heavy oil solution gas drive and depletion rates have on the production of heavy oil and gas entrained therein. Capillary numbers $N_c$ are calculated for a plurality of cells in the reservoir model representative of the subterranean reservoir for which fluid properties are to be simulated. $S_{gc}$ and/or $k_{rgro}$ values are selected from the capillary number dependent correlations based upon the capillary numbers $N_c$ calculated for the cells. Adjusted baseline correlations are then developed. For example, the original endpoints of the baseline curve, i.e. $S_{gc}^0$ and $k_{rgro}^0$, are replaced with the new capillary number dependent $S_{gc}$ and $k_{rgro}$ values and the curve therebetween adjusted, such as by linear scaling. FIG. 2 suggests that an adjusted baseline curve can be developed by changing the original endpoint values $S_{gc}^0$ and $k_{rgro}^0$ to other values of $S_{gc}$ and $k_{rgro}$ which are based, in part, upon the velocity of oil $v_a$ flow through the cells.

Gas relative permeabilities $k_{rg}$ for the plurality of cells are selected from corresponding adjusted baseline correlations. These relative permeabilities $k_{rg}$ are then used in a reservoir simulation to predict a property of at least one fluid in a subterranean reservoir containing heavy oil entrained with gas. This predicted property may be the production of oil, water or gas. Preferably, once saturation $S_g$ in a cell is equal to or greater than the critical gas saturation $S_{gc}$ level, the current adjusted baseline correlation for that cell is fixed for the remaining simulation time-steps. This fixing of the adjusted baseline correlation once gas begins to flow assists in maintaining stability during the solution of the system of equations modeling the reservoir.

One or both of the capillary dependent correlations of $S_{gc}$ or $k_{rgro}$ can be used in adjusting the baseline correlation to come up with an adjusted baseline correlation. These adjusted baseline correlations, through the use of the capillary numbers $N_c$, capture the effects that the depletion rate/fluid velocity flow and viscosity have on relative permeability during heavy oil production under heavy oil solution gas drive. Preferably, depletion experiments are performed at various depletion rates to develop the capillary number dependent correlations for the $S_{gc}$ and $k_{rgro}$. However, if necessary, it is possible to theoretically predict what such capillary number dependent correlations should be.

Relative permeabilities $k_{rg}$ can fee selected which are dependent upon capillary numbers $N_c$ calculated at the beginning of a time step in a reservoir simulation. Alternatively, the capillary numbers $N_c$ can be repeatedly calculated throughout iterations in a timestep to provide constant updating of relative permeability curves during the simulation. Again, this updating of a capillary number $N_c$ for relative permeability curves of a cell is preferably stopped once the saturation $S_g$ in a cell remains at or above the critical gas saturation $S_g$, during simulation.

It is an object of the present invention to enhance reservoir performance forecasting by better accounting for fluid flow effects due to heavy oil solution gas drive than in conventional reservoir simulators thereby improving the predictive capability of reservoir simulations involving heavy oil flow in subterranean formations which can lead to improved reservoir management strategies.

It is another object to experimentally determine values for critical gas saturations $S_{gc}$ and/or for endpoint of gas relative permeability $k_{rgro}$ for a core sample at a number of different depletion rates and correlate these values against capillary numbers $N_{ca}$ to create capillary number dependent correlations. These capillary number $N_{ca}$ dependent correlations can be used in conjunction with a reservoir model, and calculated capillary numbers $N_c$ calculated during a reservoir simulation, to more accurately estimate relative permeabilities $k_{rg}$ to be used in the reservoir simulation of heavy oil.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

1. Introduction

The present invention accounts for the effects of heavy oil solution gas drive, and more particularly, for the effects that the rates of fluid depletion have on heavy oil production. Velocity or depletion rate dependent relative permeability values $k_{rg}$ are utilized in a heavy oil reservoir simulation to provide for more accurate reservoir simulation forecasts than are achieved with conventional reservoir simulation.

In a preferred embodiment, capillary numbers $N_c$, which are dependent on oil velocities $v_a$, are calculated for reservoir cells. These capillary numbers $N_c$ are used to adjust baseline relative permeability correlations to account for the velocity or depletion rate effects on relative permeability $k_{rg}$. In this preferred embodiment, capillary number $N_{ca}$ dependent critical gas saturations $S_{gc}$ and/or endpoint relative permeabilities $k_{rgro}$ correlations are first developed, preferably based on laboratory experiments. Then values of $S_{gc}$ and/or $k_{rgro}$, corresponding to the capillary number $N_c$ calculated for a cell, are used to adjust the baseline relative permeability correlation for that cell. Relative permeability $k_{rg}$ values are then selected from these capillary number adjusted baseline relative permeability correlations based upon the saturations $S_g$ in the cells.

Figure 3:
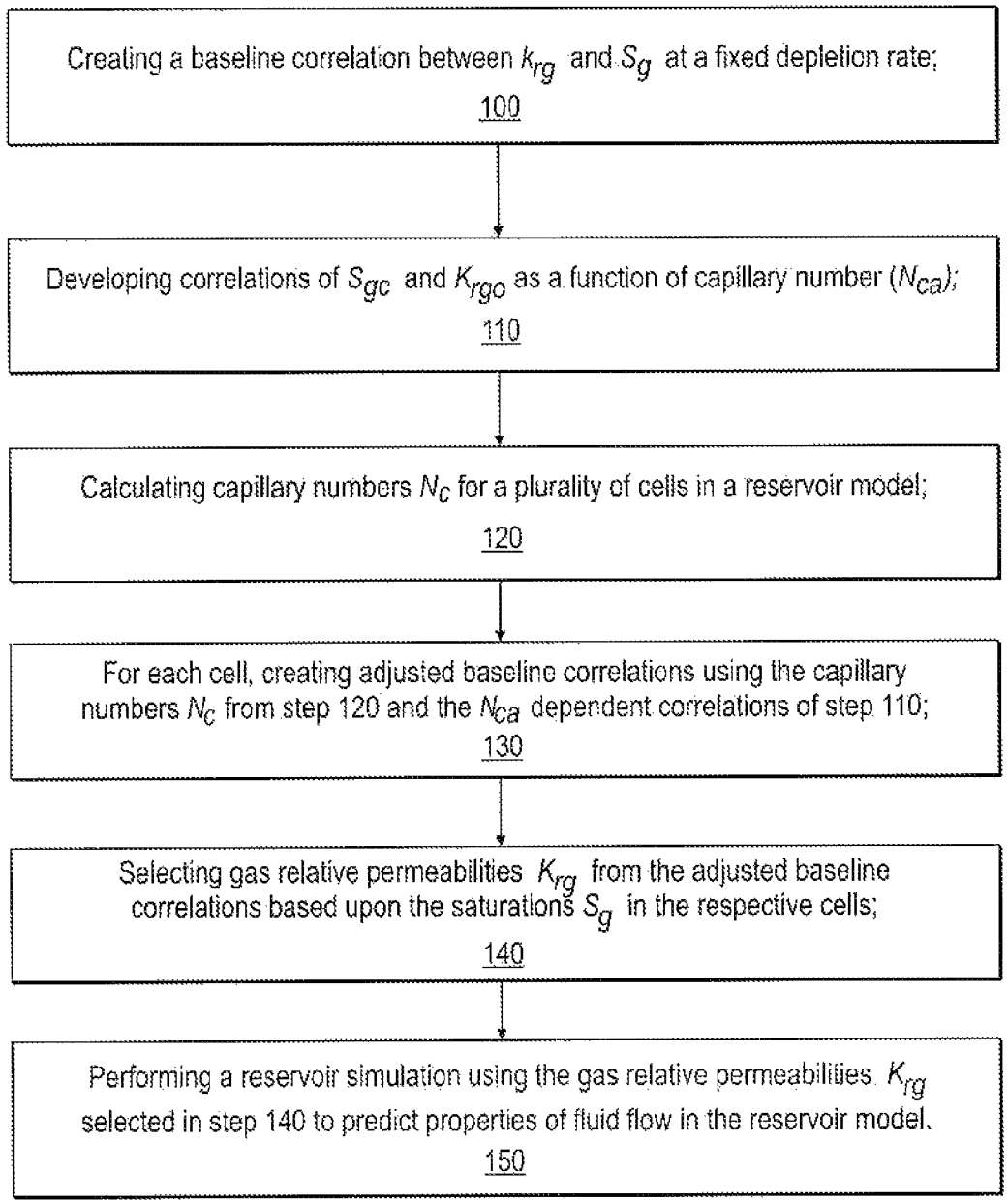
FIG. 3 shows a flowchart of steps taken in a preferred embodiment of the present invention for carrying out reservoir simulation which utilizes gas relative permeabilities $k_{rg}$ which are dependent upon local velocities $v_a$ of fluid flow in cells.

FIG. 3 provides an exemplary flowchart of steps which may be used to implement the heavy oil solution gas drive reservoir simulation of the present invention. In step 100, a baseline correlation is created between $k_{rg}$ and $S_g$. Correlations are then developed between $S_{gc}$ and $N_{ca}$ and/or $k_{rgro}$ and $N_{ca}$ in step 110. For a number of cells in a reservoir model, capillary numbers $N_c$ are calculated in step 120. For each of these cells, adjusted baseline correlations between $k_{rg}$ and $S_g$ are established in step 130 which are dependent upon $N_c$ and the correlations developed in step 110. Gas relative permeabilities $k_{rg}$ are then selected in step 140 for each of the cells from the adjusted baseline correlations between $k_{rg}$ and $S_g$ using saturation $S_g$ values from the cells. These capillary number dependent permeabilities $k_{rg}$ are then used in step 150 in a reservoir simulation to predict properties of fluid flow in the reservoir model.

A description of an exemplary test method for establishing correlations between $S_{gc}$ and $N_{ca}$ and between $k_{rgro}$ and $N_{ca}$ will be described. Then, modifications will be described which are made to a conventional reservoir simulator to incorporate the depletion rate/capillary number dependent $S_{gc}$ and/or $k_{rgro}$ correlations for selecting relative permeabilities $k_{rg}$ when conducting a reservoir simulation.

II. Establishing Correlations

A. Baseline Gas Relative Permeability $k_{rg}$ vs. Saturation $S_g$ Correlations Correlations between gas relative permeability $k_{rg}$ and saturation $S_g$ are established so that relative permeability values $k_{rg}$ can be utilized by a reservoir simulator based upon known saturations values $S_g$ in cells of a reservoir model. Ideally, these correlations are experimentally developed from core samples from the reservoir for which the reservoir simulation is to be performed. Alternatively, representative sand packs and/or synthetic oil may also be used to develop the correlations. The preferred methods to establish these baseline correlations are the methods of Johnson, Bossler, and Naumann or else the method Jones and Roszell, which were cited above in the background section and are well known to those skilled in establishing permeability curves. Alternatively, there are many other well known schemes for establishing gas relative permeability $k_{rg}$ versus saturation $S_g$ curves for reservoir rocks and fluids. Typically, $k_{rg}$ is going to be a function of $S_g$. For practical reasons, one often normalizes the gas saturation used in the $k_{rg}$ correlation. One such normalization is described in Eqn. 12. Such normalization allows the simulator to readily evaluate $k_{rg}$ for changing endpoints, (e.g., $S_{gc}$ and $S_{org}$)

If core samples are not available, then the correlations between relative permeability $k_{rg}$ and $S_g$ saturation $S_g$ can be theoretically estimated. As a non-limiting example, an analogous formation maybe used to initially establish baseline curves. Non-limiting examples of correlations may take several forms such as curves, mathematical expressions, look-up tables, etc.

Figure 1:
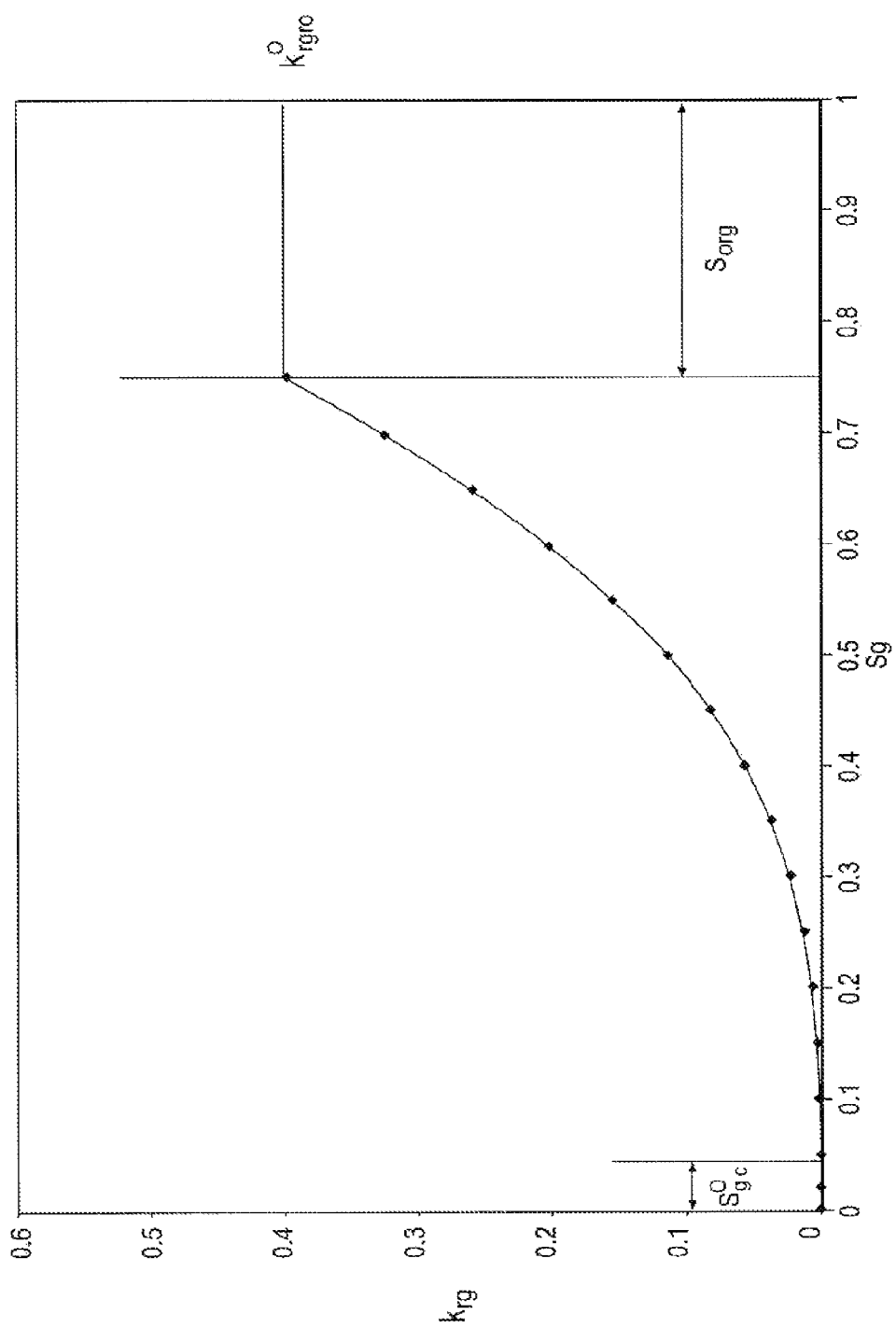
FIG. 1 shows a conventional gas relative permeability $k_{rg}$ versus saturation $S_g$ curve.

FIG. 1 is an exemplary baseline curve or correlation of gas relative permeability $k_{rg}$ versus saturation $S_g$. A baseline value for $S_{gc}^0$ is shown at about 0.03 or 3%. Above this value, it is expected that gas will begin to flow freely rather than being primarily trapped within the the porous medium. The maximum gas saturation $S_g$ is about 76% with there being a 24% saturation of residual oil saturation $S_{org}$. It is assumed there is very little presence of water for this example. At the maximum gas saturation $S_g$=76%, the maximum gas relative permeability $k_{rgro}^0$, is approximately 0.4%.

B. Correlations Between $S_{gc}$ vs. $N_{ca}$ and $k_{rgro}$ vs. $N_{ca}$

Laboratory experiments were conducted at various depletion rates to establish $S_{gc}$ vs. $N_{ca}$ and $k_{rgro}$ vs. $N_{ca}$ correlations. $S_{gc}$ is obtained in a method to be described below. $N_{ca}$ is calculated using Eqn. (8) below. From the experiments and history matching using reservoir simulations on core or sandpack samples, values of $S_{gc}$, $k_{rgro}$ and $N_{ca}$ for each depletion rate were obtained. Then correlations between $S_{gc}$ and $N_{ca}$ and between $k_{rgro}$ and $N_{ca}$ were obtained by curve fitting the $S_{gc}$, $k_{rgro}$ and $N_{ca}$ data. History matching of production data on the core samples may be used to enhance the accuracy of the correlations.

1. Live Oil Preparation

Live oil was prepared by combining unfiltered dead oil and methane. The water content of the oil was negligible. PVT (Pressure, Volume, and Temperature) data: Gas-Oil-Ratio ($R_s$), Oil Formation Volume Factor ($B_o$) and Gas Formation Volume Factors ($B_g$), were determined through a combination of experiments (constant composition expansion, flash, density measurement) and tuning of equation of states. Live oil viscosity was measured in a capillary viscometer (ID=0.05 in) at reservoir temperature. Table 1 lists relevant properties of the live oil at 178° F.

TABLE 1

Properties Of Crude Oil

| | |
|---|---|
| Bubble Point Pressure (Psia) | 1350 |
| Solution GOR (cc/cc) | 20 |
| $B_o$ at Bubble Point Pressure | 1.0918 |
| Live Oil Viscosity (cp) | 240 |
| Dead Oil Viscosity (cp) | 1300 |

2. Depletion Experiments

Depletion experiments were conducted at constant depletion rates in either a horizontal 80-cm long sandpack or in a 29-cm horizontal composite core (4 plugs). The sand used in the sandpack experiments was clean Ottawa sand ranging in size from 75 to 125 μm. The sand was packed in a specially made Viton sleeve equipped with pressure ports. The sandpack and composite core porosities were measured with a helium porosimeter. Sandpack and composite core properties are listed in Table 2:

TABLE 2

Sandpack And Composite Core Properties

| | Sandpack | Composite core |
|---|---|---|
| Temperature, ° F. | 178 | 178 |
| Length, cm | 80 | 29 |
| Diameter, cm | 5.04 | 5.04 |
| Overburden Pressure, psia | 2050 | 2050 |
| Porosity | 0.33 | 0.27 |
| Pore Volume, cm³ | 560 | 162 |
| Live Oil Permeability, md | 2000 | 1850 |
| Range of Depletion Rates, cm³/min | 0.002 to 0.3 | 0.0003 to 0.03 |

Figure 4:
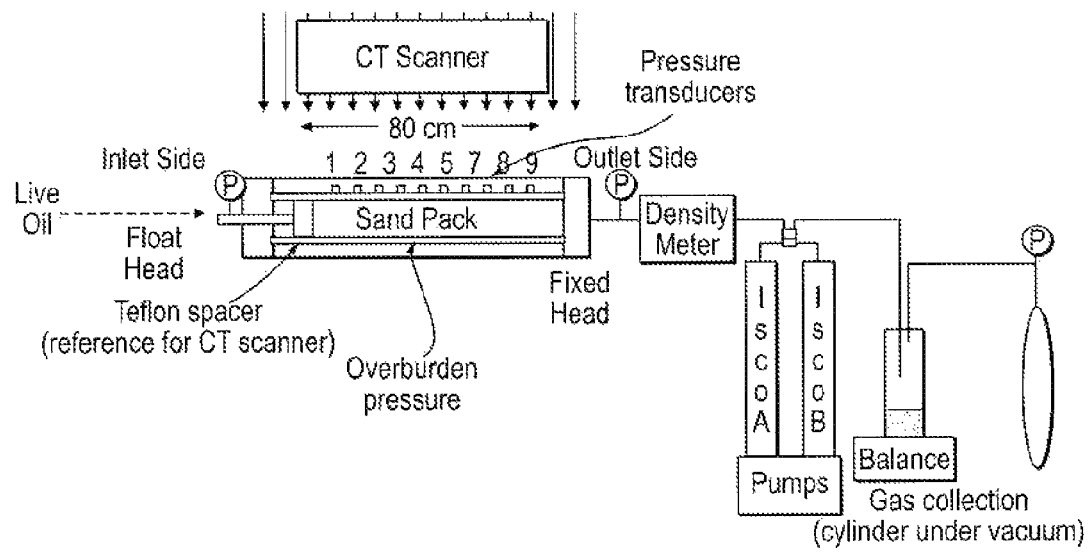
FIG. 4 shows a schematic drawing of an experimental setup used to determine gas saturation $S_g$ from core and sandpack samples.

The depletion rate was controlled using one or two ISCO pumps operating in a refill mode. FIG. 4 shows a schematic of the experimental set-up. During the depletion, the pressure (inlet, outlet, and at several points along the core), the production of oil and gas, and the density of the effluent was monitored. The coreholder was placed in a Siemens Somatom HiQ CT scanner to monitor spatial and temporal gas saturation.

3. Procedure

The dry sandpack was initially CT (Computer Tomography) scanned at reservoir conditions (i.e., under overburden stress and at temperature). The core was then flushed with $CO_2$, evacuated and saturated with kerosene at a back pressure of ~1600 psia. The sandpack (or composite core) permeability was measured with kerosene at several flow rates. The kerosene-saturated sandpack was also CT-scanned. The sandpack porosity was calculated using the wet and dry CT-scans and CT number of air and kerosene. Live oil was then slowly injected into the core to displace the kerosene. Permeability of the sandpack was also measured with live oil at several flow rates. The live-oil injection rate was then reduced so that the differential pressure across the core was less than 2 psi.

The live-oil saturated sandpack was CT-scanned to record initial conditions. Depletion was started at a pressure of ~1500-1700 psia (about 150-350 psi above the bubble point pressure). The inlet valve was closed and the downstream Isco pump A was operated at a constant withdrawal rate. After a given depletion time, the pumps were switched and Isco pump B withdrew fluids while Isco pump A delivered oil and gas into the collection system. The pump cycle was repeated until the outlet pressure decreased to about 200 psia. Pressures, temperatures and fluid accumulation in the collection system were continuously recorded using conventional delta acquisition software. The density of the produced fluid was continuously measured using an in-line density meter. The sandpack was also periodically scanned to determine directly gas saturation, $S_g$, as a function of time and position.

4. CT-Scanning

A Siemens Somatom HiQ CT scanner was used to monitor spatial and temporal gas saturation. This third generation CT-scanner has 768 stationary detectors and a rotating X-ray source. Scans were conducted at 133 kV and the scan time was 2.7 seconds. The voxel size was approximately 0.625 mm³ for a scan thickness of 10 mm and the uncertainty in saturation measurement was +/−1.5 saturation units. Scan thicknesses of 10 mm and/or 5 mm were acquired.

5. Results

Figure 5:
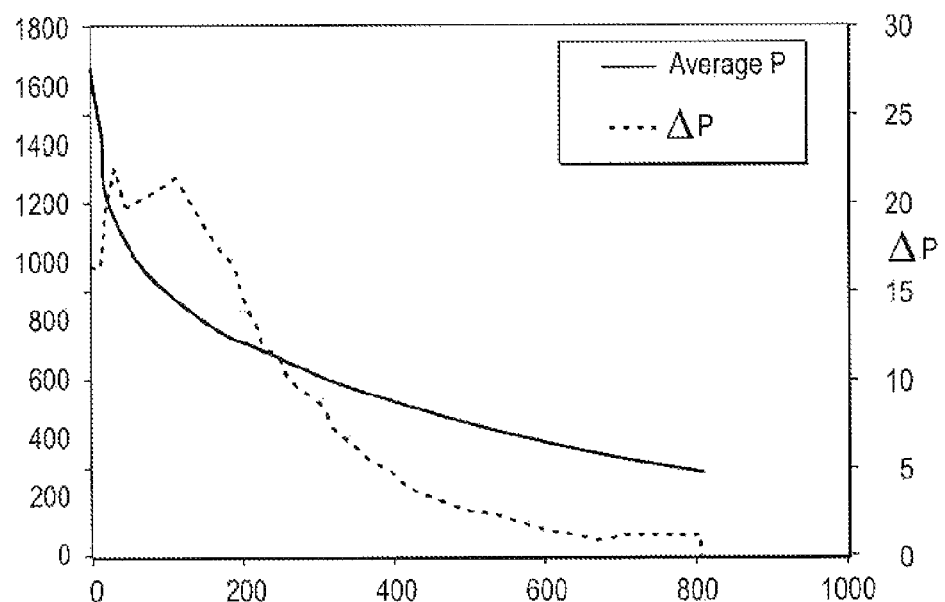
FIG. 5 depicts a graph of average sandpack pressure and pressure differential versus time across a sandpack sample in a last depletion experiment.
Figure 6:
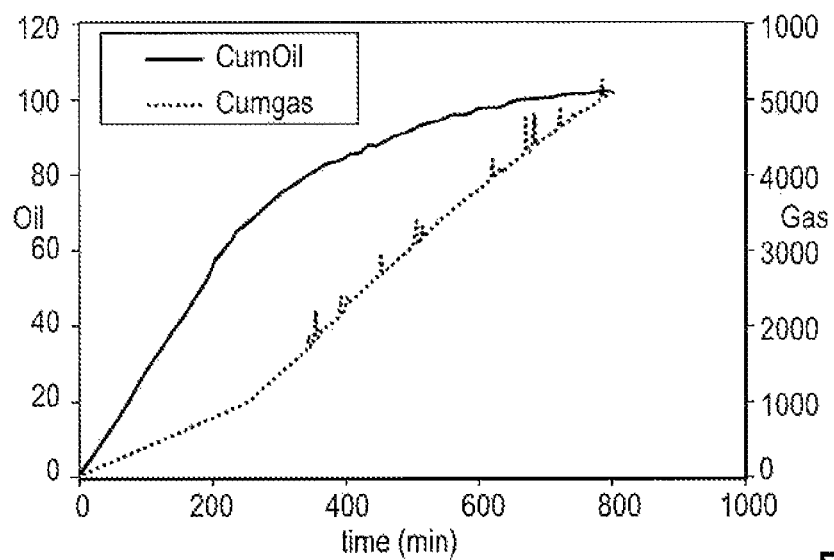
FIG. 6 illustrates a graph of cumulative oil and gas produced in the fast depletion experiment of FIG. 5.

During the course of experiments pressure information along the core and at the closed core inlet and open core outlet, the amount of oil and gas produced, the effluent density and gas saturation (via the CT-scanner) were acquired. The typical responses observed during an experiment are shown in FIGS. 5 and 6. FIG. 5 shows the average sandpack pressure and pressure differential across the sandpack during a fast depletion experiment. FIG. 6 illustrates the cumulative oil and gas produced during a fast depletion experiment.

While not wishing to be held to a particular theory, it is believed that at an early time, production is through oil and formation expansion only (there is no free gas in the system) and the pressure falls rapidly. At the (apparent) bubble point pressure, gas bubbles start to nucleate. As the pressure decreases below the bubble point pressure, gas bubbles slowly grow in size and oil production is dominated by gas expansion. As can be seen from FIG. 5, the rate of pressure decrease was significantly reduced. Oil was the only moving phase and the gas collected was by liberation of dissolved gas in the collection system. At the critical gas saturation $S_{gc}$, gas bubbles are connected throughout the sandpack and gas starts to flow freely. Note that there is a significant increase in gas production while the oil production tapered off (see the sharp break in the cumulative gas production plot at ~270 minutes).

Figure 7:
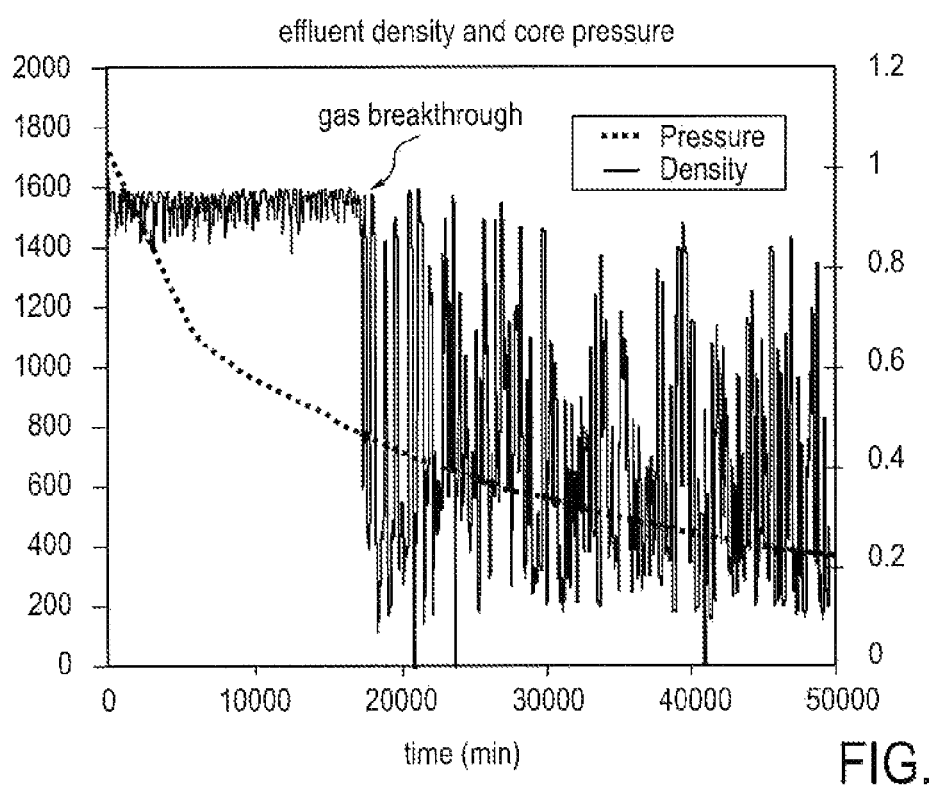
FIG. 7 shows a graph of average sandpack sample pressure and effluent density for a slow depletion experiment.
Figure 8:
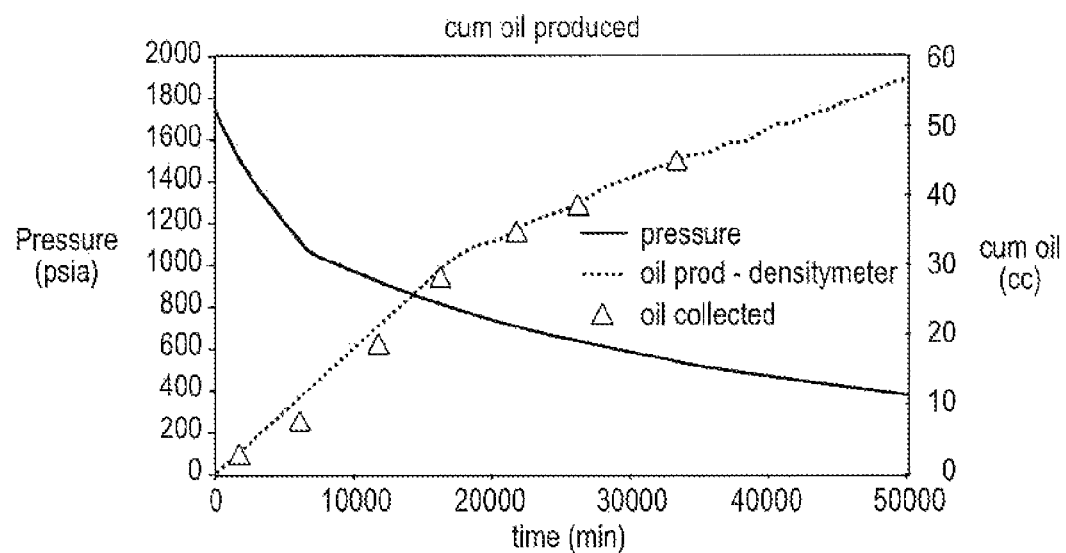
FIG. 8 depicts a graph of average sandpack sample pressure and cumulative oil produced for a slow depletion experiment.

For the slower depletion rate experiments in the sandpacks and for the core experiments, the effluent density was also measured. FIGS. 7 and 8 show typical responses which were observed with this instrument. FIG. 7 illustrates the average sandpack pressure and effluent density for a slow depletion experiment. FIG. 8 depicts the average sandpack pressure, cumulative oil produced (collected in the separator and inferred based on the effluent density) for a slow depletion experiment.

6. Rate Effect

Figure 9:
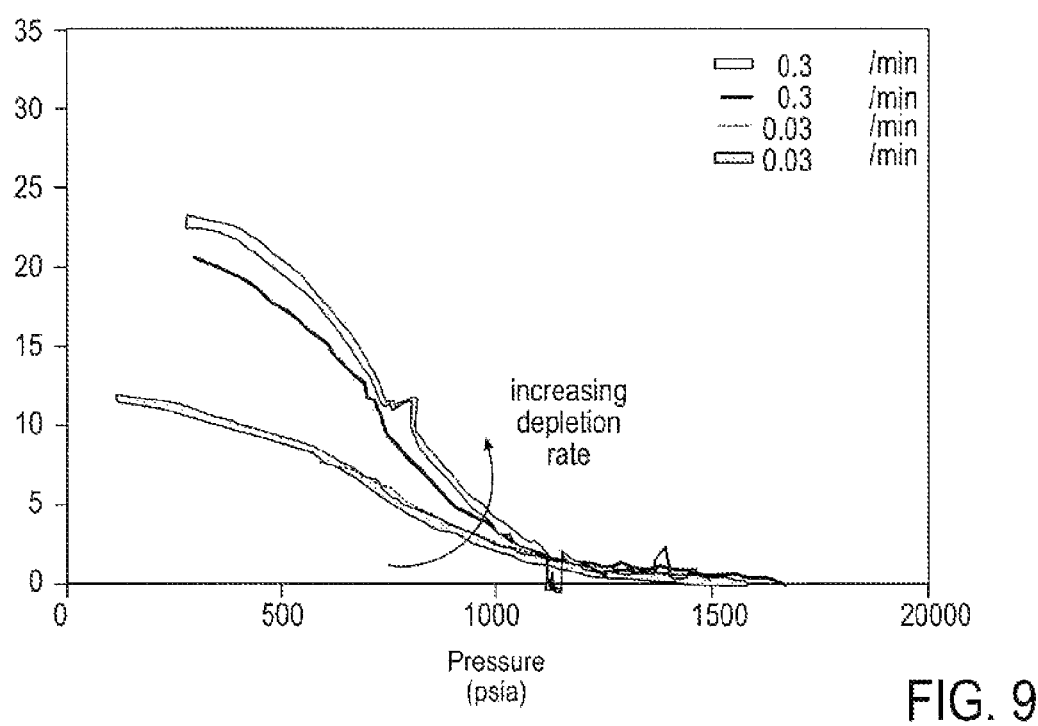
FIG. 9 shows a graph of oil recovery as a function of average pore pressure for sandpack experiments at depletion rates of 0.3 and 0.03 cc/min.
Figure 10:
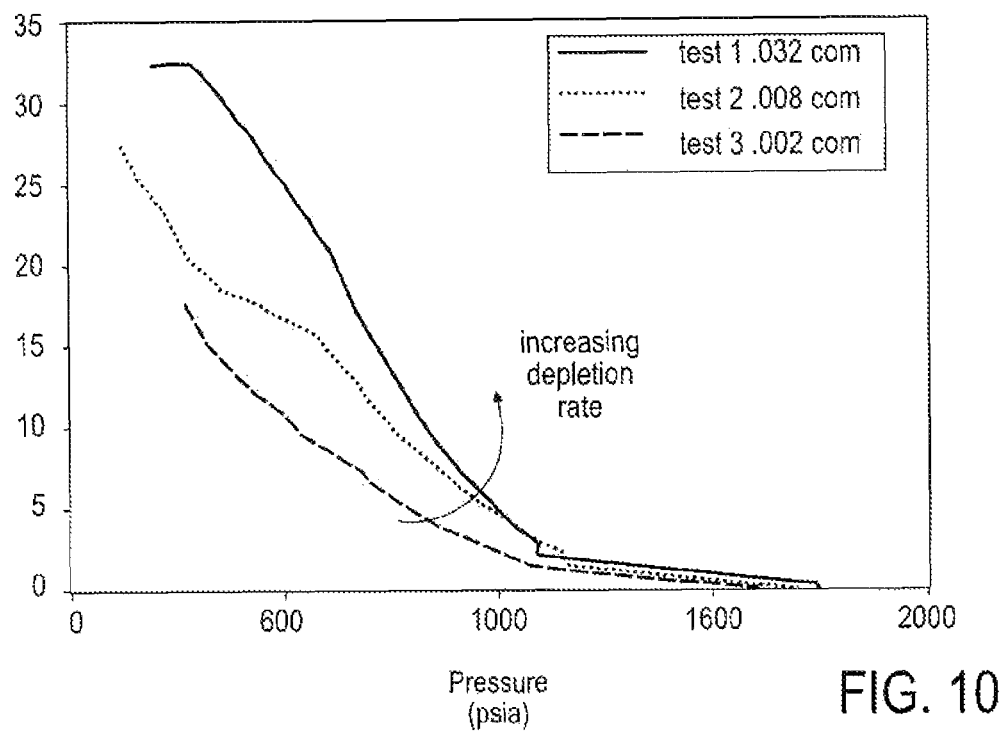
FIG. 10 is a graph of oil recovery as a function of average pore pressure for core experiments at depletion rates of 0.082, 0.08, and 0.002 cc/min, respectively.

The main effect observed during the depletion experiments was that oil recovery is highly sensitive to the depletion rate. This phenomenon was observed with both large sandpack experiments (FIG. 9) and small core experiments (FIG. 10). FIG. 9 illustrates oil recovery as a function of average pore pressure (sandpack experiments–rates=0.3 and 0.03 cc/min). FIG. 10 shows oil recovery as a function of average pore pressure. (Core experiments–rates=0.082, 0.08, and 0.002 cc/min.)

In addition to the rate effect, note that the overall oil recovery observed in these experiments is quite large (up to ~30%

OOIP). Such high recovery and this dependency on depletion rates can not be readily explained by traditional physics. Moreover, this phenomenon is not modeled properly with current commercial simulators.

7. Data Analysis—$S_g$ and $S_{gc}$ Determination

Figure 11:
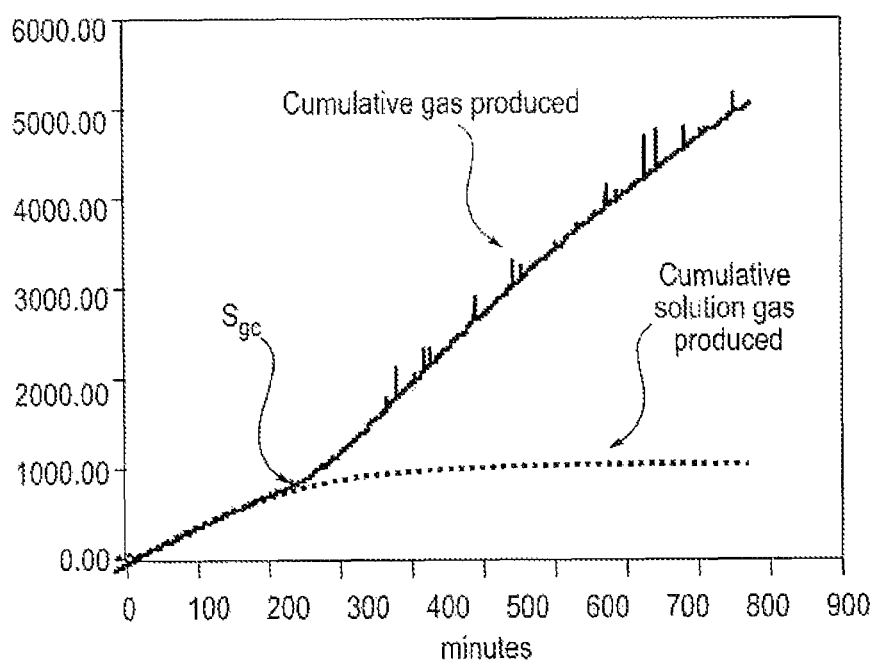
FIG. 11 is a graph of cumulative gas produced (measured) and cumulative solution gas produced (calculated) vs. time.

The critical gas saturation $S_{gc}$ is the saturation at which the cumulative gas produced starts to increase significantly. FIG. 11 shows the cumulative gas produced (measured) and cumulative solution gas produced (calculated) vs. time. The critical gas saturation $S_{gc}$ can also be determined based on the effluent density.

With the set-up described in FIG. 4, there are several ways to determine the gas saturation:
(1) direct in situ measurement with the CT-scanner;
(2) material balance using the amount of fluids collected in the collection system; and
(3) material balance using the density of the effluent stream.

Methods 2 and 3 require the use of PVT data (namely formation volume factor and density as a function of pressure).

Material Balance:

$$S_g = 1 - S_o \quad (1)$$

$$S_O = \frac{(N - N_p) \times B_O}{N \times B_{Oi} \times (1 - c_f(P_i - P))} \quad (2)$$

where N is the oil in place (stb) at the beginning of the experiment and at pressure $P_1$, $N_p$ is the cumulative oil produced (stb) at pressure P ($N_p$ is measured with the collection system), $B_o$ and $B_{oi}$ are the oil formation volume factors at P and $P_1$, respectively and $c_f$ is the rock or sandpack compressibility (1/psi).

Above the bubble point, oil is produced through oil and formation expansion only. That is $$N_p = (c_o + c_f) \times (P_i - P) \frac{B_{oi}}{B_o} \times N \quad (3)$$

where the oil compressibility is given by $$c_O = \frac{B_O - B_{Oi}}{B_{Oi} \times (P_i - P)} \quad (4)$$

With $c_o$ known, the sandpack and composite core compressibility are calculated using Eqn. (3).

As noted above, $N_p$ is measured through the collection system. Alternatively, the amount of oil produced can be based on the effluent density, $\rho_{eff}$:

$$N_p = \text{depletion\_rate} \times \frac{\rho_{eff} - \rho_g}{\rho_o - \rho_g} \times \Delta t \times \frac{1}{B_o} + N_{p-1} \quad (5)$$

Both porosity and gas saturation can be calculated using the CT-scanner. Porosity is given by $$\Phi = \frac{CT_{saturated\_core} - CT_{dry\_core}}{CT_{dry} - CT_{gas}} \quad (6)$$

where $CT_{saturated\_core}$ is the CT number for the sandpack saturated with kerosene (at initial pressure), and $CT_{dry\_core}$ is, the CT number of the sandpack saturated, with gas. $CT_{liq}$ and $CT_{gas}$ are the CT numbers for kerosene and air, respectively.

Similarly, the gas saturation is obtained with the following equation:

$$S_g = \frac{CT_p - CT_{saturated\_core}}{CT_{dry\_core} - CT_{saturated\_core}} \quad (7)$$

where $CT_p$ is the CT number measured during the depletion (at pressure P), $CT_{saturated\_core}$ is the CT number for the sandpack saturated with live oil (at initial pressure), and $CT_{dry\_core}$ is the CT number of the sandpack saturated with air and at initial pressure.

8. Data Analysis—Capillary Number Calculation

For each experiment, the average capillary number ($N_{ca}$) was calculated using the pressure differential recorded during the depletion. The capillary number can be calculated in several ways. In this preferred embodiment, the following formula was used:

$$N_{ca} = \frac{K \times \Delta P}{\sigma \times L} \quad (8)$$

where K is the permeability of the core or sandpack, $\sigma$ is the gas-oil surface tension (estimated to be 80 dyn/cm for the oil used in the experiment), L is the sandpack length, and $\Delta P$ is the pressure differential observed before the gas is becomes mobile.

9. Data Analysis—$S_{gc}$ and $k_{rgro}$ as a Function of $N_{ca}$

Based on the above analysis, $S_{gc}$ is plotted as a function of $N_{ca}$ for all the available experiments. The data is then curve fit, preferably, using an exponential function (Eqn. (9)) to interpolate/extrapolate the missing data. The coefficient "a" and exponent "b" values are specific to each oil/rock system.

By way example, and not-limitation, the preferred mathematical correlations between $S_{gc}$ and $k_{rgro}$ as functions of $N_{ca}$ are as follows:

$$\vec{S}_{gc} - S_{gc}^o = a \cdot \log(\vec{N}_{ca}) + b \quad (9)$$

and $$\frac{\tilde{K}_{rgro}}{K_{rgro}^o} = c \cdot (\vec{N}_{ca})^d \quad (10)$$

$S_{gc}^0$ and $k_{rgro}^0$ are "conventional" critical gas saturation and end-point of gas relative permeability values, respectively, as described above in the background and as shown in FIG. 1.

Reservoir simulations conducted on core samples at various depletion rates are used to determine the values for $k_{rgro}$. For each simulation run, the critical gas saturation $S_{gc}$ is known, so this endpoint on a gas relative permeability $k_{rg}$ versus saturation $S_g$ is known. Various estimates are made for the other endpoint of the curve $k_{rgro}$. A trial and error method is then used to determine which estimated value of $k_{rgro}$ matches the experimental production output from the core sample at a particular depletion rate. This history matching of experimental production results with simulated runs is used to determine $k_{rgro}$ at a number of depletion rates, which correspond to $N_{ca}$ values. These values of $k_{rgro}$ versus $N_{ca}$ are then curve fit to arrive at a capillary number dependent correlation. Most preferably, this correlation is in the form of Eqn. (10) with values of "c" and "d" being determined.

III. Reservoir Simulation Utilizing Heavy Oil Solution Gas Drive

Figure 2:
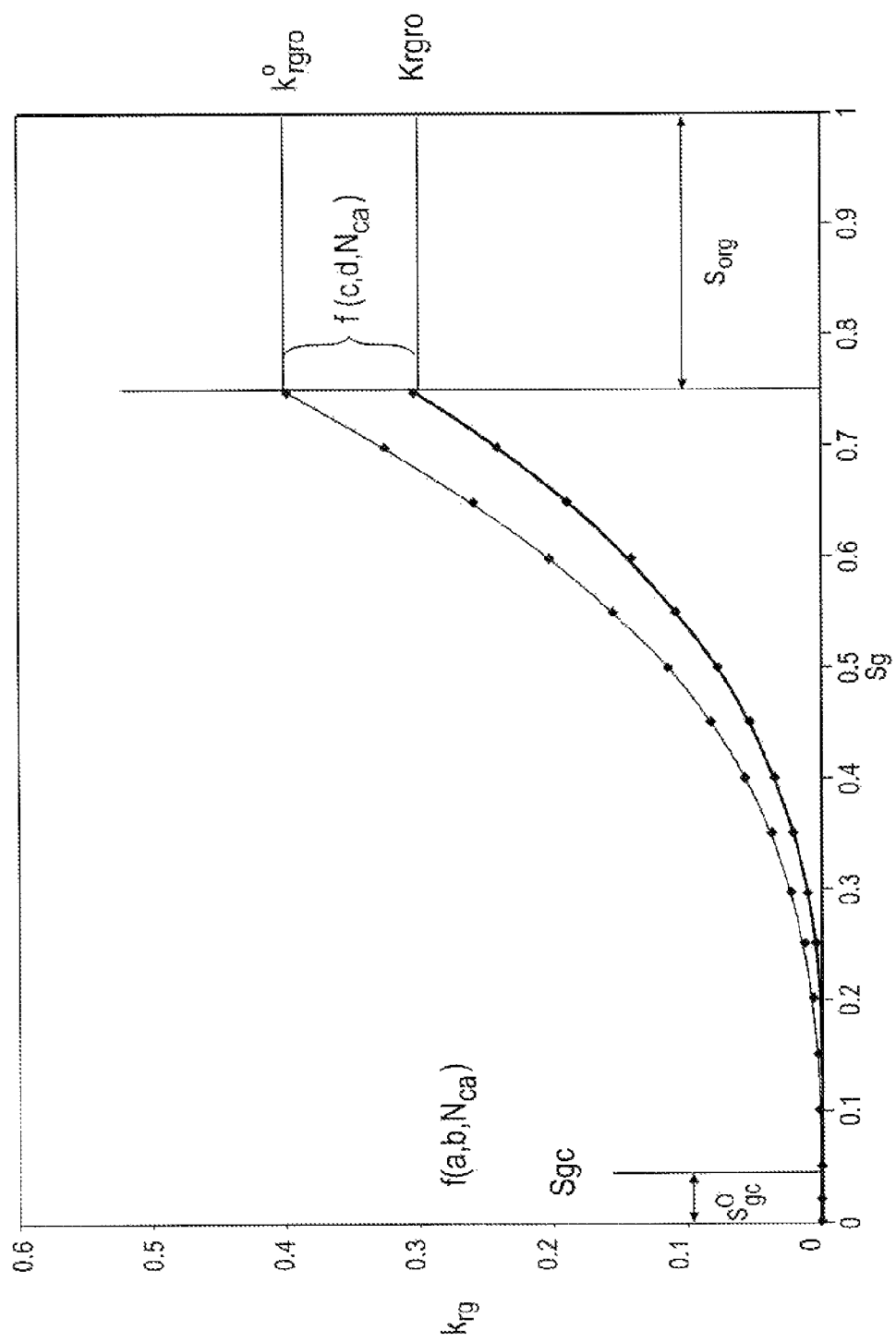
FIG. 2 depicts adjusting the conventional curve of FIG. 1 by modifying, the endpoints of $S_{gc}^0$ and $k_{rgro}^0$ to coincide with values of $S_{gc}$ and $k_{rgro}$ selected from capillary number dependent correlations of $S_{gc}$ versus $N_{ca}$ and $k_{rgro}$ versus $N_{ca}$.

Functional forms of $S_{gc}$ and $k_{rgro}$ vs. $N_{ca}$, obtained from experimental data, are implemented in this exemplary embodiment, preferably, using a modified implicit algorithm in a reservoir simulator. By way example, and not limitation, the preferred forms for $S_{gc}$ and $k_{rgro}$ are input as functions of $N_{ca}$ using Eqns. (9) and (10) from above. The parameters a, b, c and d are user's input to the reservoir simulator. Note in FIG. 2, that $S_{gc}$ is a function of a, b, and capillary number $N_{ca}$. Similarly, $k_{rgro}$ is a function of c, d, and $N_{ca}$. In the preferred embodiment of this invention, the following are default values: a=$10^4$; b=1.0; c=$10^4$ and d=-1. Ideally, the calculated $S_{gc}$ and $k_{rgro}$ values are limited to user's specified maximums and minimums, respectively. For example, maximum $S_{gc}$=0.1 and minimum value of $k_{rgro}$=$10^{-4}$ may be used. Since $N_c$ is directional, $S_{gc}$ and $k_{rgro}$ are calculated for each cell face and thus are directional too.

To reduce oscillation and convergence problems, a modified implicit algorithm of the preferred embodiment is implemented to calculate $S_{gc}$ and $k_{rgro}$. When the gas-phase is not mobile, i.e., saturation $S_g \leq S_{gc}$, $S_{gc}$ and $k_{rgro}$ are calculated, for example, using Eqns. (9) and (10), respectively. When the gas-phase is flowing, $S_{gc}$ and $k_{rgro}$ become invariant—neither increase nor decrease. Their values are calculated using the capillary number $N_c$ at the beginning of the time-step when the gas-phase becomes, mobile and fixed for all remaining time-steps.

A. Calculation of Cell Capillary Numbers $N_c$

In this preferred exemplary embodiment, a modified expression for capillary number $N_c$ is preferably incorporated into the reservoir simulator using the following expression:

$$\vec{N}_c = \frac{\vec{K} \cdot \nabla \Phi_o}{\sigma_{og}} = \frac{\vec{K} \cdot \nabla (P_o - \rho_o g D)}{\sigma_{og}} \quad (11)$$

where $\sigma_{og}$ is oil-gas inter-facial tension, K is rock permeability, $\Phi_o$ is oil-phase potential, $P_o$ is the change in pressure across a face of a cell, $\rho_o$=density of oil, g=gravitational constant, and D=change in depth from a datum.

This modified definition of $N_c$ leaves out oil relative permeability in the equation. Since $N_c$ is ideally computed implicitly, this greatly simplifies the calculation of derivatives for gas relative permeability ($k_{rg}$) as a function of primary variables during Jacobian generation. Also, the potential gradient in the $N_c$ calculation is directional and is based on the gradient across the face of the two adjacent grid blocks. For each Newton iteration, a capillary number $N_c$ is calculated for each grid-block face. In a 3-D model, there will be six directional $N_c$ for each grid block. Each $N_c$ corresponds to one of the six values at the cell faces. The use of directional $N_c$ results in a Jacobian that can be easily solved by conventional linear equation solvers. For wells, in this preferred embodiment, an averaged $N_c$ from all grid-block faces is calculated.

B. Adjusting Baseline Relative Permeability Correlations

Each cell is assigned a particular rock type or facies. Each of these rock types or facies corresponds to particular baseline gas relative permeability $k_{rg}$ vs. saturation $S_g$ curve, such as the one shown in FIG. 1. These respective baseline curves are adjusted for each respective cell. This is accomplished for each cell by replacing the original values of $S_{gc}^0$ and $k_{rgro}^0$ with capillary number dependent values of $S_{gc}$ and $k_{rgro}$ calculated using Eqns. (9) and (10) and the particular capillary number $N_c$ calculated for each respective cell. The baseline curve connecting these endpoints is preferably adjusted by scaling. Scaling of the relative permeability could be done using several methods. Equation (12) shows such a method:

$$K_{rg} = F\left(\frac{S_g - S_{gc}}{1 - S_{gc} - S_{org}}\right) \quad (12)$$

Eqn. (12) simply states that $k_{rg}$ is a function of $S_g$, $S_{gc}$ and $S_{org}$. (For gas saturation greater than $S_{org}$ the oil phase is immobile—i.e., $K_{ro}$=0). The function F could be (but is not limited to) a simple power law:

$$K_{rg} = K_{rgro}^0 \left(\frac{S_g - S_{gc}}{1 - S_{gc} - S_{org}}\right)^2 \quad (13)$$

In the conventional treatment of gas relative permeabilities, $S_{gc}$ in Eqn. 12 or 13 is equal to $S_{gc}^0$. However, with this formulation, $S_{gc}$ in Eqns. 12 and 13 is now a function of the capillary number.

Additionally, if the endpoint of gas relative permeability $k_{rgro}$ is decreased by 10% relative to the original $k_{rgro}^0$ of the baseline curve, then all gas relative permeability values on the correlation or curve will be decreased by 10%. Those skilled in the art will appreciate that many other ways of adjusting the baseline curve to reflect changes in the updated values of endpoints $S_g$, and/or $k_{rgro}$ can be used and are within the scope of this invention as well.

C. Selecting Gas Relative Permeabilities $k_{rg}$ for Incorporation into the Reservoir Simulator Saturation values $S_g$ may come from initial conditions when the reservoir simulation is first started, from the previous time step, or else from values calculated during Iterations within a time step. The saturation $S_g$ of each reservoir cell is then examined and the corresponding relative permeability $k_{rg}$ is selected from the adjusted baseline correlation. As described above, if $S_g \geq S_{gc}$, then the correlation from the previously calculated curve is used to determine $k_{rg}$.

D. Running Reservoir Simulation Using Selected Gas Relative Permeabilities $k_{rg}$ Finite difference equations are solved to determine unknowns, such as pressure P or saturation $S_g$. These finite difference equations rely upon the latest updated relative permeabilities $k_r$, including the capillary number dependent gas permeabilities $k_{rg}$ for the reservoir cells. Such finite difference equations are well known those skilled in the art of reservoir simulation. Examples of well known solution methods for such equations include: (1) Fully Explicit; (2) Implicit Pressure, Explicit Saturation (IMPES); (3) fully Implicit; (4) Sequential Implicit (SEQ), Adaptive Implicit (AIM); and Cascade. In the preferred embodiment, a fully implicit method is used to solve these equations.

If the solutions to a state variable, i.e. pressure or saturation, are within a satisfactory tolerance range during an iteration, then final fluid properties will be established for a timestep. Volumes of production of gas, water and oil during the timestep can be established from these fluid properties, as is conventionally done with reservoir simulators. The reservoir simulator may then run over many more timesteps until a predetermined length of time is met. The cumulative production over these timesteps provides an estimation of the production from the subterranean formation.

The present invention also include a system for carrying out the above reservoir simulation using relative permeabilities $k_{rg}$ that are dependent upon depletion rate/fluid velocity and viscosities of crude oil. Further, the present invention also includes a program storage device which carries instructions for carrying out this reservoir simulation using fluid velocity dependent relative permeabilities.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

NOMENCLATURE a=coefficient for calculating $S_{gc}$;
b=exponent for calculating $S_{gc}$;
$B_{oi}$=oil formation volume factor at $P_1$;
$B_o$=oil formation volume factor at P;
Bg=gas formation volume factor at P;
c=coefficient for calculating $k_{rgro}$;
$c_f$=rock or core sample compressibility (1/psi);
$c_o$=oil sample compressibility (1/psi):
$CT_{dry\_core}$=CT number of a sample saturated with gas;
$CT_{saturated\_core}$=CT number of a sample saturated with kerosene (at initial pressure);
$CT_p$=CT number measured during depletion at pressure P;
$CT_{liq}$=CT number for kerosene;
$CT_{gas}$=CT number for air;
d=exponent for calculating $k_{rgro}$;
D=change in depth from a datum;
g=gravitational constant;
$k_e$=effective permeability;
$k_r$=relative permeability, dimensionless;
$k_{rg}$=gas relative permeability, dimensionless;
$k_{rgro}$=gas relative permeability with minimum residual oil; dimensionless;
$k_{rgro}^0$=endpoint gas relative permeability with minimum residual oil, dimensionless;
$k_{ro}$=oil relative permeability, dimensionless;
K=rock permeability;
K=slope of the solution-gas curve, $psi^{-1}$
$N_c$=capillary number calculated for a particular cell of a reservoir model;
$N_{ca}$=capillary number;
ΔP=change in pressure (psi);
L=length of test chamber (inches);
N=oil in place (stb) at initial conditions;
$N_p$=cumulative oil produced (stb) at pressure P ($cm^3$);
$\Phi_o$=oil-phase potential,
$P_1$=pressure at time i, psi;
$\Delta P_o$=the change in pressure across a face,
$\rho_{eff}$=effective density;
$\rho_g$=density of gas;
$\rho_o$=density of oil;
$R_s$=Gas-to-oil ratio;
S=saturation, dimensionless;
$S_g$=gas salutation, dimensionless;
$S_{gc}$=critical gas saturation, dimensionless;
$S_o$=oil saturation, dimensionless;
$S_{gc}^o$=endpoint critical gas saturation, dimensionless;
$S_{org}$=residual oil saturation to gas for a particular rock region, dimensionless;
stb=stock tank barrel;
σ=interfacial tension;
$\sigma_{og}$=oil-gas interfacial tension; and
$v_o$=velocity of oil.

What is claimed is:

1. A computer-implemented method of predicting a property of at least one fluid in a subterranean reservoir containing heavy oil entrained with gas, the method comprising:
   (a) utilizing, with a computer, a baseline correlation of gas relative permeability $k_{rg}$ versus gas saturation $S_g$ in a reservoir simulator;
   (b) utilizing, with the computer, a capillary number dependent correlation between at least one of critical gas saturations $S_{gc}$ and capillary numbers $N_{ca}$ and endpoint gas relative permeabilities $k_{rgro}$ and capillary numbers $N_{ca}$ in the reservoir simulator;
   (c) calculating, with the computer, capillary numbers $N_c$ for a plurality of cells in a reservoir model representative of the subterranean reservoir, wherein calculating the capillary numbers $N_c$ for the plurality of cells in the reservoir model includes using a plurality of directional capillary numbers $N_c$ for grid blocks in the reservoir model, wherein each directional capillary number $N_c$ corresponds to a grid block cell face;
   (d) adjusting, with the computer, the baseline correlation to comport with at least one of $S_{gc}$ and $k_{rgro}$ selected from the capillary number dependent correlation of step (b) using the capillary numbers $N_c$ calculated in step (c) to produce a plurality of corresponding adjusted baseline correlations;
   (e) selecting, with the computer, relative permeabilities $k_{rg}$ for the plurality of cells from the corresponding adjusted baseline correlations of step (d); and
   (f) running, with the computer, a field scale reservoir simulation utilizing the selected relative permeabilities $k_{rg}$ of step (e) to predict a property of the heavy oil in the subterranean reservoir.

2. The method of claim 1 wherein:
   the step of utilizing a capillary number dependent correlation includes utilizing a correlation between $S_{gc}$ and $N_{ca}$.

3. The method of claim 1 wherein:
   the step of utilizing a capillary number dependent correlation includes utilizing a correlation between $k_{rgro}$ and $N_{ca}$.

4. The method of claim 1 wherein:
   the step of utilizing a capillary number dependent correlation includes utilizing a correlation between $S_{gc}$ and $N_{ca}$ and utilizing a correlation between $k_{rgro}$ and $N_{ca}$.

5. The method of claim 4 wherein:
   the step of adjusting the baseline correlations comports with values of $S_{gc}$ selected from the correlation between $S_{gc}$ and $N_{ca}$ and with values of $k_{rgro}$ selected from the correlation between $k_{rgro}$ and $N_{ca}$.

6. The method of claim 1 wherein:
   the step of utilizing a capillary number dependent correlation includes conducting depletion experiments on core samples from the subterranean reservoir.

7. The method of claim 1 wherein:
   the step of utilizing a capillary number dependent correlation includes predicting the correlation without conducting depletion experiments on a core sample from the subterranean reservoir.

8. The method of claim 1 wherein:
   the step of developing a capillary number dependent correlation includes conducting depletion experiments on sandpack samples.

9. The method of claim 1 wherein:
the capillary number $N_{ca}$ which is calculated for the plurality of cells remains fixed in a time step iteration.

10. The method of claim 1 wherein:
the capillary numbers which are calculated for the plurality of cells are updated during iterations of a time step conducted in the reservoir simulation.

11. The method of claim 1 wherein:
the capillary number dependent correlation is a look-up table.

12. The method of claim 1 wherein:
the capillary number dependent correlation is a mathematical function.

13. The method of claim 1 wherein:
the reservoir simulator uses a fully implicit method to solve equations.

14. A computer-implemented method for simulating the flow of heavy oil in a subterranean reservoir, the method comprising:
creating, with a computer, a reservoir model representative of a subterranean reservoir for which fluid flow is to be simulated;
determining, with the computer, velocity-dependent relative permeabilities for reservoir cells that account for a velocity of the fluid flow through the reservoir cells, the velocity-dependent relative permeabilities for the reservoir cells being determined using a gas relative permeability versus gas saturation correlation constructed by scaling a baseline gas relative permeability versus gas saturation correlation to at least one of a critical gas saturation and an endpoint gas relative permeability, including adjusting the baseline correlation using calculated capillary numbers $N_c$ for a plurality of cells in the reservoir model, wherein calculating the capillary numbers $N_c$ for the plurality of cells includes using a plurality of directional capillary numbers $N_c$ for grid blocks in the reservoir model, wherein each directional capillary number $N_c$ corresponds to a grid block cell face; and
running, with the computer, a reservoir simulation utilizing the velocity-dependent relative permeabilities to simulate the flow of heavy oil in the subterranean reservoir.

15. A computer system for simulating the flow of heavy oil in a subterranean reservoir, the computer system comprising:
a non-transitory program storage device carrying computer instructions to perform a method of reservoir simulation; and
a processor for executing the computer instructions of the program storage device to perform the method of reservoir simulation, the method of reservoir simulation comprising the steps of:
(a) utilizing a baseline correlation of gas relative permeability $k_{rg}$ versus gas saturation $S_g$;
(b) utilizing a capillary number dependent correlation between at least one of critical gas saturations $S_{gc}$ and capillary numbers $N_{ca}$ and endpoint gas relative permeabilities $k_{rgro}$ and capillary numbers $N_{ca}$;
(c) calculating capillary numbers $N_c$ for a plurality of cells in a reservoir model representative of the subterranean reservoir containing heavy oil, wherein calculating the capillary numbers $N_c$ for the plurality of cells in the reservoir model includes using a plurality of directional capillary numbers $N_c$ for grid blocks in the reservoir model, wherein each directional capillary number $N_c$ corresponds to a grid block cell face;
(d) adjusting the baseline correlation to comport with at least one of $S_{gc}$ and $k_{rgro}$ selected from the capillary number dependent correlation of step (b) using the capillary numbers $N_c$ calculated in step (c) to produce a plurality of corresponding adjusted baseline correlations;
(e) selecting relative permeabilities $k_{rg}$ for the plurality of cells from the corresponding adjusted baseline correlations of step (d); and
(f) simulating the flow of the heavy oil in the subterranean reservoir utilizing the selected relative permeabilities $k_{rg}$ of step (e).

16. A computer-implemented method for predicting a property of at least one fluid in a subterranean reservoir containing heavy oil entrained with gas, the method comprising:
(a) inputting, with a computer, a baseline correlation of gas relative permeability $k_{rg}$ versus gas saturation $S_g$ that defines a baseline critical gas saturation $S_{gc}$ and a baseline endpoint gas relative permeability $k_{rgro}$ into a reservoir simulator;
(b) calculating, with the computer, at least one of an updated critical gas saturation $S_{gc}$ and an updated endpoint gas relative permeability $k_{rgro}$ based upon a plurality of depletion rates;
(c) adjusting, with the computer, the baseline correlation to comport with at least one of the updated critical gas saturation $S_{gc}$ and the updated endpoint gas relative permeability $k_{rgro}$ using calculated capillary numbers $N_c$ for a plurality of cells in a reservoir model representative of the subterranean reservoir, wherein calculating the capillary numbers $N_c$ for the plurality of cells includes using a plurality of directional capillary numbers $N_c$ for grid blocks in the reservoir model, wherein each directional capillary number $N_c$ corresponds to a grid block cell face;
(d) selecting, with the computer, relative permeabilities $k_{rg}$ for the plurality of cells from the adjusted baseline correlation of step (c); and
(e) running, with the computer, a field scale reservoir simulation utilizing the selected relative permeabilities $k_{rg}$ of step (d) to predict a property of the heavy oil in the subterranean reservoir.

17. The method of claim 14 wherein:
the baseline gas relative permeability versus gas saturation correlation defines a baseline critical gas saturation; and
scaling, with the computer, the baseline gas relative permeability versus gas saturation correlation to at least one of the critical gas saturation and the endpoint gas relative permeability comprises adjusting all gas relative permeability values on the baseline gas relative permeability versus gas saturation correlation by-replacing the baseline critical gas saturation with the critical gas saturation and applying linear scaling.

18. The method of claim 14 wherein:
the baseline gas relative permeability versus gas saturation correlation defines a baseline endpoint gas relative permeability; and
scaling, with the computer, the baseline gas relative permeability versus gas saturation correlation to at least one of the critical gas saturation and the endpoint gas relative permeability comprises adjusting all gas relative permeability values on the baseline gas relative permeability versus gas saturation correlation by a ratio of the endpoint gas relative permeability to the baseline endpoint gas relative permeability.

19. The method of claim 14 wherein the critical gas saturation is calculated, with the computer, using a capillary number dependent correlation.

20. The method of claim 14 wherein the endpoint gas relative permeability is calculated, with the computer, using a capillary number dependent correlation.

* * * * *